United States Patent
Zheng et al.

(10) Patent No.: US 10,967,466 B2
(45) Date of Patent: Apr. 6, 2021

(54) LAYERED ASSEMBLIES FOR SUPERALLOY ARTICLE REPAIR

(71) Applicant: Kennametal Inc., Latrobe, PA (US)

(72) Inventors: Qingjun Zheng, Export, PA (US);
Michael Meyer, Ligonier, PA (US);
Martin G. Perez, Latrobe, PA (US);
Abdelhakim Belhadjhamida, Kingston (CA)

(73) Assignee: KENNAMETAL INC., Latrobe, PA (US)

( * ) Notice: Subject to any disclaimer, the term of this patent is extended or adjusted under 35 U.S.C. 154(b) by 421 days.

(21) Appl. No.: 15/492,413

(22) Filed: Apr. 20, 2017

(65) Prior Publication Data

US 2018/0304420 A1 Oct. 25, 2018

(51) Int. Cl.
| | |
|---|---|
| *C22C 19/05* | (2006.01) |
| *B23P 6/04* | (2006.01) |
| *B23K 1/00* | (2006.01) |
| *B23K 35/02* | (2006.01) |
| *B23K 35/30* | (2006.01) |
| *B23K 101/00* | (2006.01) |
| *B23K 103/08* | (2006.01) |

(52) U.S. Cl.
CPC ............ *B23P 6/045* (2013.01); *B23K 1/0018* (2013.01); *B23K 35/0238* (2013.01); *B23K 35/0244* (2013.01); *B23K 35/304* (2013.01); *C22C 19/056* (2013.01); *C22C 19/057* (2013.01); *B23K 2101/001* (2018.08); *B23K 2103/08* (2018.08)

(58) Field of Classification Search
None
See application file for complete search history.

(56) References Cited

U.S. PATENT DOCUMENTS

| | | | | |
|---|---|---|---|---|
| 6,491,207 | B1 * | 12/2002 | Smashey ................ | B23K 31/02 228/119 |
| 2010/0059146 | A1 * | 3/2010 | Sato ....................... | B23K 35/004 148/530 |
| 2013/0255442 | A1 * | 10/2013 | Imano ................ | B23K 35/3033 75/302 |
| 2018/0236612 | A1 * | 8/2018 | Cui ........................ | C22C 19/058 |
| 2018/0304420 | A1 * | 10/2018 | Zheng ................... | C22C 19/056 |

OTHER PUBLICATIONS

Oerlikon Metco, Material Product Data Sheet, Amdry DF-4B Diffusion Braze Alloy, printed Aug. 10, 2014 (3 pages). (Year: 2014).*

* cited by examiner

*Primary Examiner* — Adam Krupicka
(74) *Attorney, Agent, or Firm* — Larry R. Meenan

(57) ABSTRACT

Methods of superalloy article repair are provided. In some embodiments, a method for repairing a nickel-based superalloy article comprises providing a layered assembly over a damaged region of the nickel-based superalloy article, the layered assembly comprising a nickel-based superalloy preform, an infiltration alloy preform and a melting point depressant component. The layered assembly is heated to form a nickel-based filler alloy metallurgically bonded to the damaged region, wherein primary carbide and secondary carbide phases are present in the nickel-based filler alloy in a combined amount of 0.5 to 10 vol. %.

12 Claims, 4 Drawing Sheets

LAYERED ASSEMBLIES FOR SUPERALLOY ARTICLE REPAIR

FIELD

The present invention relates to methods and compositions for repair of superalloy articles and, in particular, to layered assemblies employing nickel-based superalloy preforms in conjunction with infiltration alloy preforms.

BACKGROUND

Components of gas turbines, including blades and vanes, are subjected to harsh operating conditions leading to component damage by one or more mechanisms. Gas turbine components, for example, can suffer damage from thermal fatigue cracks, creep, oxidative surface degradation, hot corrosion and damage by foreign objects. If left unaddressed, such damage will necessarily compromise gas turbine efficiency and potentially lead to further turbine damage.

In view of such harsh operating conditions, turbine components are often fabricated of nickel-based or cobalt-based superalloy exhibiting high strength and high temperature resistance. Employment of superalloy compositions in conjunction with complex design and shape requirements renders gas turbine fabrication costly. A single stage of vanes for an aircraft turbine incurs a cost in the tens of thousands of dollars. Moreover, for industrial gas turbines, the cost can exceed one million dollars. Given such large capital investment, various methods have been developed to repair turbine components, thereby prolonging turbine life. Solid state diffusion bonding, conventional brazing, transient liquid phase bonding (TLP) and wide gap repair processes have been employed in turbine component repair. However, each of these techniques is subject to one or more disadvantages. Solid state diffusion bonding, for example, requires expensive jigs for alignment, application of high pressure and tight tolerances for mating surfaces. Such requirements increase cost and restrict turbine locations suitable for repair by this method. Conventional brazing results in a weld of significantly different composition than the superalloy component and is prone to formation of brittle eutectic phases. In contrast, TLP provides a weld of composition and microstructure substantially indistinguishable from that of the superalloy component. However, TLP is limited to structural damage or defects of 50 μm or less. As its name implies, wide gap repair processes overcome the clearance limitations of TLP and address defects in excess of 250 μm. Nevertheless, increases in scale offered by wide gap repair are countered by the employment of filler alloy compositions incorporating elements forming brittle intermetallic species with the superalloy component. Wide gap methods additionally suffer from sintering shrinkage wherein the filler alloy separates from the damaged area of the superalloy article. Such separation can produce cracking that is fatal to the repair.

SUMMARY

In one aspect, methods employing layered assemblies for the repair of superalloy articles and/or apparatus are described herein. Additionally, superalloy articles repaired by such layered assemblies are also provided. In some embodiments, for example, a nickel-based superalloy article comprises a damaged region and a nickel-based filler alloy metallurgically bonded to the damaged region, the nickel-based filler alloy having composition of 8-15 wt. % chromium, 7-14 wt. % cobalt, 0.1-5 wt. % molybdenum, 5-11 wt % tungsten, 1-5 wt. % tantalum, 2-7 wt. % aluminum, 0.1-1.5 wt % boron, 0.1-5 wt % titanium, 0-2 wt % hafnium, 0.05-1 wt. % carbon, 0-0.5 wt. % yttrium and the balance nickel, wherein primary carbide and secondary carbide phases are present in the nickel-based filler alloy in a combined amount of 0.5 to 10 vol. %. In some embodiments, the filler alloy can exhibit mechanical properties comparable to the nickel-based superalloy of the article, including tensile strength, ductility and/or fatigue resistance.

In some embodiments, a method for repairing a nickel-based superalloy article comprises providing a layered assembly over a damaged region of the nickel-based superalloy article, the layered assembly comprising a nickel-based superalloy preform, an infiltration alloy preform and a melting point depressant component. The layered assembly is heated to form a nickel-based filler alloy metallurgically bonded to the damaged region, wherein primary carbide and secondary carbide phases are present in the nickel-based filler alloy in a combined amount of 0.5 to 10 vol. %.

These and other embodiments are further described in the following detailed description.

DETAILED DESCRIPTION

Figure 1:
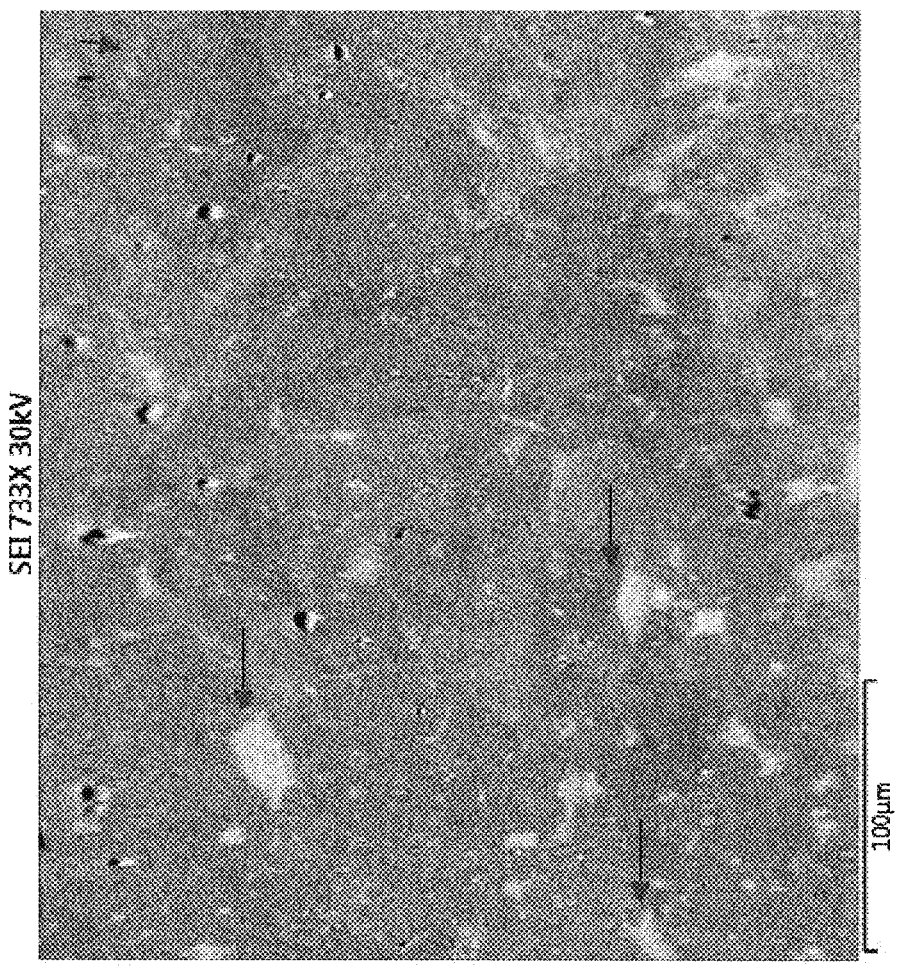
FIG. 1 is a scanning electron microscopy (SEM) image of nickel-based filler alloy of Example 1 herein taken at a tilt angle of 70° for electron backscatter diffraction (EBSD) analysis.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous-modifications and adaptations will be readily apparent to those of skill in the art without departing from the spirit and scope of the invention.

I. Repaired Superalloy Articles

In one aspect, nickel-based superalloy articles comprising one or more damaged regions repaired by nickel-based filler alloy are described herein. The nickel-based filler alloy can become a load bearing component of the superalloy article and exhibit mechanical properties comparable to the nickel-based superalloy forming the article, including tensile strength, ductility and/or fatigue resistance. In some embodiments, a nickel-based superalloy article comprises a damaged region and a nickel-based filler alloy metallurgically bonded to the damaged region, the nickel-based filler alloy having composition of 8-15 wt. % chromium, 7-14 wt. % cobalt, 0.1-5 wt. % molybdenum, 5-11 wt % tungsten, 1-5 wt. % tantalum, 2-7 wt. % aluminum, 0.1-1.5 wt % boron, 0.1-5 wt % titanium, 0-2 wt % hafnium, 0.05-1 wt. % carbon, 0-0.5 wt. % yttrium and the balance nickel, wherein primary carbide and secondary carbide phases are present in the nickel-based filler alloy in a combined amount of 0.5 to 10 vol. %. In some embodiments, the nickel-based filler alloy has composition selected from Table I.

TABLE I

Nickel-based Filler Alloy Composition

| Filler Alloy | Ni (wt. %) | Cr (wt. %) | Co (wt. %) | Mo (wt. %) | W (wt. %) | Ta (wt. %) | Al (wt. %) | B (wt. %) | Ti (wt. %) | Hf (wt. %) | C (wt. %) | Y (wt. %) |
|---|---|---|---|---|---|---|---|---|---|---|---|---|
| 1 | Bal. | 9-13 | 8-12 | 0.1-1 | 6-10 | 1.5-4 | 3-6 | 0.4-0.9 | 0.3-1 | 0.3-2 | 0.05-0.5 | 0-0.3 |
| 2 | Bal. | 10-12 | 9-11 | 0.3-0.5 | 5-7 | 2-3 | 4-5 | 0.5-0.8 | 0.5-0.8 | 0.6-1 | 0.05-0.2 | 0-0.1 |

As described herein, the nickel-based filler alloy can comprise primary carbide and secondary carbide phases in a combined amount of 0.5 to 10 vol. %. Volume percent of the primary and secondary carbide phases can be determined by electron backscatter diffraction (EBSD) and scanning electron microscopy (SEM). Energy dispersive X-ray analysis (EDS) can also be employed for further quantification of primary and secondary carbide phases of the nickel-based filler alloy. In some embodiments, secondary $M_{23}C_6$ carbides are present in the filler alloy in an amount of 0.1 to 5 vol. %, wherein M is one or more transition metals selected from the group consisting of chromium, molybdenum and tungsten. Secondary $M_{23}C_6$ carbides can also be present in the nickel-based filler alloy in an amount selected from Table II.

TABLE II

| $M_{23}C_6$ of Ni-based filler alloy (vol. %) |
|---|
| 0.5-4.5 |
| 1-5 |
| 1.5-4 |
| 2-3 |
| 0.1-3.5 |

$M_{23}C_6$ carbides are generally present at grain boundaries of the nickel matrix and can exhibit globular morphology. In some embodiments, $M_{23}C_6$ carbides are present as a chain of discontinuous globules along grain boundaries of the nickel matrix. In other embodiments, $M_{23}C_6$ carbides can display other morphologies such as platelets, lamellae, sheets and/or cellular structures. In being located at grain boundaries, $M_{23}C_6$ carbides can serve to increase thermal creep strength by resisting or preventing grains from sliding.

Primary carbides can also be present in the nickel-based filler alloy. In some embodiments, primary MeC carbides are present in an amount of 0.5 to 5 vol. %, wherein Me is selected form the group consisting of titanium, tantalum and hafnium. Primary MeC carbides can also be present in the nickel-based filler alloy in an amount selected from Table III.

TABLE III

| MC of Ni-based filler alloy (vol. %) |
|---|
| 1-4 |
| 3-5 |
| 0.8-1.5 |
| 1-2 |

Primary MeC carbides can be distributed heterogeneously throughout the nickel matrix, existing at grain boundaries and/or within grains of the nickel matrix. Metals (Me) of primary carbides can be selected to have higher affinity for carbon compared to metals (M) of $M_{23}C_6$ carbides. In such embodiments, the metals of primary carbides can inhibit or preclude excessive grain boundary precipitation of $M_{23}C_6$ carbides. By controlling grain boundary precipitation of $M_{23}C_6$ carbides, advantageous tensile strength and ductility properties can be achieved. Depending on infiltration conditions employed to form the nickel-based filler alloy, primary MeC carbides can be present in the nickel-based filler alloy in an amount greater than secondary $M_{23}C_6$ carbides. Alternatively, secondary $M_{23}C_6$ carbides are present in an amount greater than the primary MeC carbides. The nickel-based filler alloy, in some embodiments, also comprises a $C_2Cr_3$ phase. The $C_2Cr_3$ phase can exist at grain boundaries and/or within grains of the nickel matrix. The $C_2Cr_3$ phase can generally be present in the nickel-based filler alloy in an amount of 1-6 vol. %. In some embodiments, $C_2Cr_3$ phase is present in an amount of 3-5 vol. % or 2-4 vol. %. The nickel-based filler alloy microstructure can also be free or substantially free of brittle metal boride precipitates, including various chromium borides [CrB, (Cr,W)B, Cr(B,C), $Cr_5B_3$] and/or nickel borides such as $Ni_3B$. Further, the nickel-based filler alloy can be fully dense or substantially fully dense. In being substantially fully dense, the filler alloy can have less than 5 volume percent porosity.

The nickel-based filler alloy, in some embodiments, has ultimate tensile strength ($\sigma_{TS}$) at elevated temperature of at least 30% of $\sigma_{TS}$ for the nickel-based superalloy forming the article. In some embodiments, $\sigma_{TS}$ of the nickel-based filler alloy is at least 50% or at least 60% of the superalloy article $\sigma_{TS}$. For example, $\sigma_{TS}$ of the nickel-based filler alloy can be 50-70% of the superalloy article $\sigma_{TS}$. Additionally, the nickel-based filler alloy, in some embodiments, can exhibit % elongation of at least 2 at elevated temperature. In some embodiments, nickel-based filler alloy exhibits % elongation selected from Table IV.

TABLE IV

| % Elongation of Ni-based filler alloy |
|---|
| 2-10 |
| 2.5-10 |
| 3-10 |
| 5-10 |
| 3-9 |
| 3-8 |

$\sigma_{TS}$ and % elongation of nickel-based filler alloy described herein can be determined according to ASTM E21—Standard Test Methods for Elevated Temperature Tension Testing of Metallic Materials.

As described herein, the nickel-based filler alloy is metallurgically bonded to a damaged region of the nickel-based superalloy article. In some embodiments, the damaged region comprises one or more dimensions exceeding 1 mm, 5 mm or 10 mm. The damaged region, for example, can be a deep crater or gap in a surface of the nickel-based superalloy article. In other embodiments, the damaged region can be a hole extending through a surface or wall of the nickel-based superalloy article. In some embodiments, an interfacial transition region can be established between the nickel-based filler alloy and the nickel-based superalloy article. The interfacial transition region can exhibit a microstructure differing from the filler alloy and the nickel-based superalloy article. The interfacial transition region, in some embodiments, is free or substantially free of brittle metal boride precipitates, including the chromium boride and nickel boride species described above. For example, less than 0.5 wt. % metal boride precipitates qualifies as being substantially free of such precipitates in the interfacial transition region. An interfacial transition region, in some embodiments, has a thickness of 20-150 µm.

Subsequent to metallurgical bonding of the nickel-based filler alloy over the damaged area, the repaired nickel-based superalloy article may be subjected to additional treatments including solutionizing and heat aging. In some embodiments, a protective refractory coating can be applied to the repaired nickel-based superalloy part. For example, a protective refractory coating can comprise one or more metallic filler alloy can have any composition, microstructure and/or properties described in Section I herein.

Turning now to specific components, the nickel-based superalloy preform can comprise one or more nickel-based superalloy powders. For example, suitable nickel-based superalloy powder can be compositionally similar or consistent with one or more nickel-based superalloys employed in the fabrication of gas turbine components, such as blades and vanes. In some embodiments, nickel-based superalloy powders have compositional parameters falling within nickel-based superalloy classes of conventionally cast alloys, directionally solidified alloys, first-generation single-crystal alloys, second generation single-crystal alloys, third generation single-crystal alloys, wrought superalloys and/or powder processed superalloys. In some embodiments, a nickel-based superalloy powder has composition of 0.05-0.2 wt. % carbon, 7-9 wt. % chromium, 8-11 wt. % cobalt, 0.1-1 wt. % molybdenum, 9-11 wt. % tungsten, 3-4 wt. % tantalum, 5-6 wt. % aluminum, 0.5-1.5 wt. % titanium, less than 0.02 wt. % boron, less than 0.02 wt. % zirconium, less than 2 wt. % hafnium and the balance nickel. In several specific embodiments, the nickel-based superalloy powder component can include an alloy powder selected from Table V.

TABLE V

Nickel-based superalloy powder composition (wt. %)

| Alloy Powder | Ni | C | Cr | Co | Mo | W | Ta | Al | Ti | B | Zr | Hf |
|---|---|---|---|---|---|---|---|---|---|---|---|---|
| 1 | Bal. | 0.05-0.1 | 7-9 | 8-10 | 0.1-1 | 9-11 | 3-4 | 5-6 | 0.5-1 | 0.01-0.02 | 0.005-0.02 | 1-2 |
| 2 | Bal. | 0.1-0.2 | 8-9 | 9-11 | 0.5-1 | 9-11 | 3-4 | 5-6 | 0.5-1.5 | 0.01-0.02 | 0.01-0.1 | 1-2 |
| 3 | Bal. | 0.1-0.2 | 12-15 | 8-11 | 3-5 | 3-5 | — | 2-4 | 4-6 | 0.01-0.03 | 0.02-0.04 | — |
| 4 | Bal. | 0.1-0.2 | 14-17 | 9-11 | 8-10 | — | — | 3-5 | 3-5 | 0.005-0.02 | — | — |
| 5 | Bal. | 0.05-0.15 | 11-14 | 8-10 | 1-3 | 3-5 | 3-5 | 3-5 | 3-5 | 0.01-0.03 | 0.05-0.07 | 0.5-2 |
| 6 | Bal. | — | 9-11 | 4-6 | — | 3-5 | 11-13 | 4-6 | 1-3 | — | — | — |
| 7 | Bal. | 0.05-0.08 | 12-14 | 7-9 | 3-5 | 3-5 | 3-5 (Nb)* | 3-5 | 2-4 | 0.01-0.02 | 0.04-0.06 | — |
| 8 | Bal. | 0.02-0.04 | 15-17 | 12-14 | 3-5 | 3-5 | 0.6-0.8 (Nb)* | 1-3 | 3-5 | 0.01-0.02 | — | — |

*Nb replacing Ta elements selected from the group consisting of aluminum and metallic elements of Groups IVB, VB and VIB of the Periodic Table and one or more non-metallic elements selected from Groups IIIA, IVA, VA and VIA of the Periodic Table. A protective refractory layer can comprise a carbide, nitride, carbonitride, oxycarbonitride, oxide or boride of one or more metallic elements selected from the group consisting of aluminum and metallic elements of Groups IVB, VB and VIB of the Periodic Table. For example, one or more protective layers can be selected from the group consisting of titanium nitride, titanium carbonitride, titanium oxycarbonitride, titanium carbide, zirconium nitride, zirconium carbonitride, hafnium nitride, hafnium carbonitride and alumina and mixtures thereof.

II. Methods of Superalloy Article Repair

In another aspect, methods of superalloy article repair are provided. A method for repairing a nickel-based superalloy article comprises providing a layered assembly over a damaged region of the nickel-based superalloy article, the layered assembly comprising a nickel-based superalloy preform, an infiltration alloy preform and a melting point depressant component. The layered assembly is heated to form a nickel-based filler alloy metallurgically bonded to the damaged region, wherein primary carbide and secondary carbide phases are present in the nickel-based filler alloy in a combined amount of 0.5 to 10 vol. %. The nickel-based Suitable nickel-based superalloy powder of the preform, in some embodiments, is commercially available from various gas turbine manufacturers. Additional commercially available nickel-based superalloy powder for use in a preform described herein can comprise Mar M247, Rene 108 or CM247 LC. In some embodiments, nickel-based superalloy powder of a preform has composition selected from Table 1 listed in Bouse et al, Optimizing Rene N4 Alloy for DS AFT-Stage Bucket Applications in Industrial Gas Turbines, *Superalloys* 2008, TMS (*The Minerals, Metals and Materials Society*) 2008, pp. 99-108.

Nickel-based superalloy powder of the preform can have any desired particle size. Particle size can be selected according various criteria including, but not limited to, dispersability in a fibrous polymeric matrix, packing characteristics and/or surface area for interaction and/or reaction with the nickel-based braze alloy component. In some embodiments, for example, nickel-based superalloy powder has an average particle size of 10 µm to 100 µm or 30 µm to 70 µm. In some embodiments, nickel-based superalloy powder is present in the layered assembly in an amount of 45 to 95 weight percent of the layered assembly. In some embodiments, nickel-based superalloy powder is present in the layered assembly in an amount selected from Table VI.

TABLE VI

| Nickel-based superalloy powder in layered assembly (wt. %) |
| --- |
| 55-90 |
| 60-85 |
| 65-75 |
| 70-80 |

In addition to the nickel-based superalloy preform, a layered assembly comprises an infiltration alloy preform. An infiltration alloy perform, in some embodiments, comprises nickel-based braze alloy powder. Any nickel-based braze alloy powder not inconsistent with the objectives of the present invention can be employed. For example, suitable nickel-based braze alloy powder can have a melting point lower than the nickel-based superalloy powder of the layered assembly. In some embodiments, nickel-based braze alloy powder has a melting point at least 100° C. less than the nickel-based superalloy powder. In a specific embodiment, the nickel-based braze alloy powder can include an alloy powder having the composition set forth in Table VII.

TABLE VII

| Nickel-based braze alloy powder composition (wt %) | | | | | | | | | | | |
| --- | --- | --- | --- | --- | --- | --- | --- | --- | --- | --- | --- |
| Alloy Powder | Ni | C | Cr | Co | Mo | Fe | Ta | Al | Ti | B | Zr | Mn |
| 1 | Bal. | 0.01-0.03 | 14-17 | 9-12 | 0.005-0.02 | 0.05-0.2 | 2-5 | 2-5 | 0.005-0.02 | 1.5-3 | 0.05-0.2 | 0.005-0.02 |

Nickel-based braze alloy powder having composition falling within the parameters of Table VII is commercially available under the Amdry D15 trade designation. Additional suitable nickel-based braze alloy powders can be selected from the Amdry line and other commercially available powders. In other embodiments, nickel-based braze alloy powder has composition of Table VIII.

TABLE VIII

| Nickel Braze Alloy Component | | | | | | | |
| --- | --- | --- | --- | --- | --- | --- | --- |
| Alloy Powder | Ni wt. % | Co wt. % | Cr wt. % | B wt. % | Ta wt. % | Al wt. % | Y wt. % |
| 1 | Bal. | 5-15 | 10-20 | 1-4 | 0-5 | 0-5 | 0-0.1 |
| 2 | Bal. | 7-12 | 10-15 | 2-3 | 2-3 | 2.5-5 | 0-0.1 |

Nickel-based braze alloy powder having composition falling within the parameters of Table VIII is commercially available under the DF4B trade designation. Nickel-based braze alloy powder of the composite preform can have any desired particle size. Particle size can be selected according various criteria including, but not limited to, dispersability in a fibrous polymeric matrix, packing characteristics and/or surface area for interaction and/or reaction with the nickel-based superalloy powder. In some embodiments, for example, nickel-based, braze alloy powder has an average particle size of 10 μm to 150 μm or 40 μm to 125 μm. Further, nickel-based braze alloy powder is generally present in an amount of 10 to 45 weight percent of the layered assembly. In some embodiments, nickel-based braze alloy powder is present in the layered assembly in an amount selected from Table IX.

TABLE IX

| Nickel-based braze powder of layered assembly (wt. %) |
| --- |
| 15-40 |
| 25-35 |
| 20-30 |

A layered assembly can comprise any number of nickel-based superalloy preforms and infiltration alloy preforms. For example, a layered assembly can comprise two or more nickel-based superalloy preforms and/or two or more infiltration alloy preforms arranged in any manner Number of superalloy and/or infiltration alloy preforms can be selected according to various considerations including size and properties of the damaged area and desired compositional properties of the nickel-based filler alloy formed by heating the layered assembly.

As described herein, the layered assembly includes a melting point depressant component in addition to the nickel-based superalloy preform and nickel-based braze alloy preform. Any melting point depressant not inconsistent with the objectives of the present invention can be employed. For example, suitable melting point depressant can include boron, magnesium, hafnium, zirconium, $MgNi_2$, silicon or combinations thereof. Generally, the melting point depressant component is present in an amount of 0.2 to 5 weight percent of the layered assembly. In some embodiments, the melting point depressant component comprises boron in an amount of 0.2 to 2 weight percent of the layered assembly. Boron, in some embodiments, is the sole species of the melting point depressant component. Alternatively, boron can be combined with one or more additional melting point depressant species. For example, boron can be combined with silicon, hafnium or $MgNi_2$ to provide the melting point depressant component. The melting point depressant component, in some embodiments, is part of the nickel-based braze alloy powder and/or nickel-based superalloy powder. Nickel-based braze alloy and/or nickel based superalloy can incorporate the melting point depressant as part of the alloy composition. For example, nickel-based braze alloy powder can be selected to contain boron, silicon and/or hafnium to serve as the melting point depressant component. In such embodiments, nickel-based braze alloy powder and nickel-based superalloy powder are present in the layered assembly at a ratio to provide the desired amount of melting point depressant. For example, nickel-based braze alloy powder and nickel-based superalloy powder can be present in the layered assembly at ratio of 1:1.5 to 1:2. Alternatively, the melting point depressant component can be provided to the layered assembly independent of the nickel-based superalloy powder and/or nickel-based braze alloy powder. For example, melting point depressant powder can be added to the nickel-based braze alloy preform and/or nickel-based superalloy preform.

Moreover, in some embodiments, the nickel-based superalloy perform can also comprise an amount of nickel-based braze alloy powder. For example the nickel-based superalloy preform can comprise nickel-based braze alloy powder in an amount of 0.1 to 10 weight percent of the layered assembly. Similarly, the nickel-based braze alloy perform can comprise an amount of nickel-based superalloy powder. In some embodiments, the nickel-based braze alloy preform can comprise nickel-based superalloy powder in an amount of 0.1 to 10 weight percent of the layered assembly.

In some embodiments, nickel-based superalloy and infiltration alloy preforms can be produced as follows. The desired powder alloy composition (e.g. Ni-based superalloy powder and/or Ni-based braze alloy powder) can be associated with an organic carrier for application to one or more damaged surfaces of a superalloy article. Any organic carrier not inconsistent with the objectives of the present invention can be employed, including solid and liquid carriers. In some embodiments, suitable organic carrier for the powder alloy composition comprises a fibrous polymeric matrix. As detailed further in the examples below, the fibrous polymeric matrix can form a flexible cloth in which the powder alloy composition is dispersed. The flexible polymeric cloth can have any thickness not inconsistent with the objectives of the present invention. For example, the flexible polymeric cloth can generally have a thickness of 0.2-4 mm or 1-2 mm. Any polymeric species operable to adopt a fiber or filament morphology can be used in matrix construction. Suitable polymeric species can include fluoropoymers, polyamides, polyesters, polyolefins or mixtures thereof. In some embodiments, for example, the fibrous polymeric matrix is formed of fibrillated polytetrafluoroethylene (PTFE). In such embodiments, the PTFE fibers or fibrils can provide an interconnecting network matrix in which the powder alloy composition is dispersed and trapped. Moreover, fibrillated PTFE can be combined with other polymeric fibers, such as polyamides and polyesters to modify or tailor properties of the fibrous matrix. The fibrous polymeric matrix generally accounts for less than 1.5 weight percent of the preform. In some embodiments, for example, the fibrous polymeric matrix accounts for 1.0-1.5 weight percent or 0.5-1.0 weight percent of the nickel-based superalloy preform or infiltration alloy preform.

The preform can be fabricated by various techniques to disperse the powder alloy composition in the fibrous polymeric matrix. In some embodiments, the preform is fabricated by combining polymeric powder and nickel-based superalloy powder and/or nickel-based braze alloy powder and mechanically working the mixture to fibrillate the polymeric powder and trap the alloy powder(s) in the resulting fibrous polymeric matrix. In a specific embodiment, for example, the powder alloy composition is mixed with 3-15 vol. % of PTFE powder and mechanically worked to fibrillate the PTFE and trap the powder alloy composition in a fibrous PTFE matrix. As described herein, nickel-based superalloy powder can have composition selected from Table IV herein for producing a nickel-superalloy preform. Similarly, nickel-based braze alloy can have composition selected from Tables VI and VII herein for producing an infiltration alloy preform. Mechanical working of the powder mixture can include ball milling, rolling, stretching, elongating, extruding, spreading or combinations thereof. In some embodiments, the resulting PTFE-flexible composite preform cloth is subjected to cold isostatic pressing. A preform described herein can be produced in accordance with the disclosure of one or more of U.S. Pat. Nos. 3,743,556, 3,864,124, 3,916,506, 4,194,040 and 5,352,526, each of which is incorporated herein by reference in its entirety.

In some embodiments, a nickel-based superalloy preform described herein can exhibit green density of at least 50 percent the density of the superalloy article being repaired. In some embodiments, green density of the nickel-based superalloy preform is 50-75 percent or 60-70 percent of superalloy article density.

A layered assembly is formed by arranging nickel-based superalloy and infiltration alloy preforms over the damaged region of the nickel-based superalloy article. In some embodiments, an infiltration alloy perform is arranged over the nickel-based superalloy preform such that nickel-based braze alloy infiltrates into the nickel-based superalloy particles during heating. In other embodiments, a nickel-based superalloy preform is arranged over an infiltration alloy preform. The surface of the nickel-based superalloy article may be cleaned by chemical and/or mechanical means prior to application of a layered assembly, such as by fluoride ion cleaning and/or grinding. Moreover, one or more adhesives may be employed to fix the preforms over the damaged area of the nickel-based superalloy article.

Subsequent to application to the damaged area of the nickel-based superalloy article, the layered assembly is heated to form filler alloy metallurgically bonded to the damaged area. Heating the assembly decomposes the polymeric fibrous matrix, and the filler alloy is formed from the nickel-based superalloy powder and the nickel-based braze alloy of the preforms. The assembly is generally heated to a temperature in excess of the melting point of the nickel-based braze alloy powder and below the melting point of the nickel-based superalloy powder. Therefore, the nickel-based braze alloy powder is melted forming the filler alloy with the nickel-based superalloy powder, wherein the filler alloy is metallurgically bonded to the nickel-based superalloy part. Molten flow characteristics of the nickel-based braze alloy can permit formation of a void-free interface between the filler alloy and the nickel-based superalloy part. Heating temperature and heating time period are dependent on the specific compositional parameters of the nickel-based superalloy part and layered assembly. In some embodiments, for example, the assembly is heated under vacuum to a temperature of 1180-1250° C. for a time period of 1 to 4 hours. In some embodiments, the assemblies can be held at 800-1000° C. for a time period of 0.5-5 hours following heating to peak temperature. The resulting filler alloy can have any compositional, microstructural and/or mechanical properties described in Section I above. Subsequent to metallurgical bonding of the filler alloy over the damaged area, the repaired nickel-based superalloy part may be subjected to additional treatments including solutionizing and heat aging.

These and other embodiments are further illustrated in the following non-limiting examples.

Example 1—Nickel-Based Filler Alloy

A plate of nickel-based filler alloy was formed from a layered assembly described herein as follows. A powder composition comprising nickel-based superalloy powder having parameters of Alloy Powder 1 of Table V (Rene' 108) and nickel-based braze alloy powder having parameters of Alloy Powder 2 of Table VIII was provided. The nickel-based superalloy formed 99 wt. % of the powder composition with the remaining 1 wt % formed by the nickel-based braze alloy.

The powder composition was mixed with 5-15 vol. % of powder PTFE. The resulting mixture was mechanically worked to fibrillate the PTFE and trap the nickel-based superalloy powder and nickel-based braze alloy powder and then rolled, thus forming the nickel-based superalloy preform as a cloth-like flexible sheet of thickness 1-2 mm. This process was repeated to form the infiltration alloy preform, the difference being that the powder composition mixed with PTFE comprised 99 wt. % nickel-based braze alloy powder and 1 wt. % nickel-based superalloy powder.

The nickel-based superalloy preform was placed over a graphite base substrate. The infiltration alloy preform was arranged over the nickel-based superalloy preform to complete the layered assembly. Nickel-based superalloy powder was present in the layered assembly in an amount of 66-68 wt. %, and nickel-based braze alloy powder was present in the layered assembly in an amount of 32-34 wt %.

Figure 2:
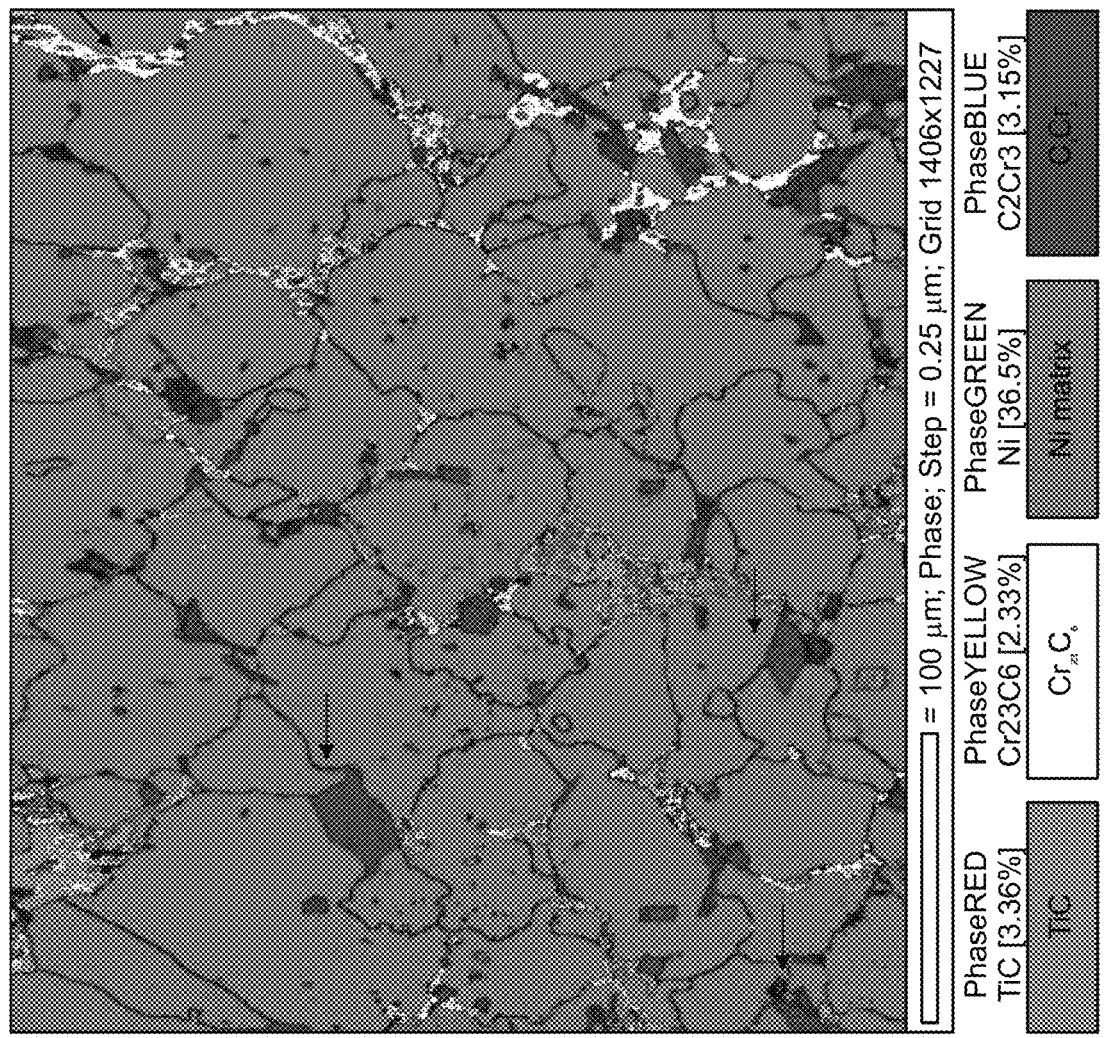
FIG. 2 is EBSD analysis quantifying microstructural phases of the nickel-based filler alloy of FIG. 1.

The layered assembly was heated in a vacuum furnace to 1190-1200° C. for a time period of 2 hours followed by heating at 1080-1090° C. for two hours. Heating was subsequently maintained at 870-880° C. for a period of 4 hours prior to cooling. The resulting nickel-based filler alloy plate was laser cut to 4×4 inches and disk ground to 0.040 in. FIG. 1 is an SEM image of the plate taken at a tilt angle of 70° for EBSD analysis. Arrows in the SEM image correspond to the arrows detailing various microstructural phases in the EBSD image of FIG. 2. As provided in FIG. 2 primary carbide of TiC and secondary carbide of $Cr_{23}C_6$ were present along grain boundaries of the nickel matrix. TiC was also found within grains of the nickel matrix. $C_2Cr_3$ phase was also present within nickel matrix grains and along matrix grain boundaries. Volume percent of the various phases are provided in Table X.

TABLE X

Phases of Nickel-based Filler Alloy

| Phase | Vol. % |
| --- | --- |
| TiC | 3.38 |
| $Cr_{26}C_3$ | 2.39 |
| $C_2Cr_3$ | 3.15 |
| Ni-matrix | 86.5 |

The plate of nickel-based filler alloy was tested for elevated temperature (1800° F.) tensile strength and % elongation according to ASTM E21. The results are provided in Table XI.

TABLE XI

Tensile and % Elongation

| UTS ($\sigma_{TS}$), ksi | Percent of Rene' 108 $\sigma_{TS}$ | % Elongation |
| --- | --- | --- |
| 30.4 | 37.2 | 3 |

As provided in Table X, $\sigma_{TS}$ of the nickel-based filler alloy was 37.2 percent of the $\sigma_{TS}$ for Rene' 108.

Example 2—Nickel-Based Filler Alloy

A plate of nickel-based filler alloy was formed from a layered assembly described herein as follows. A powder composition comprising nickel-based superalloy powder having parameters of Alloy Powder 2 of Table V (Mar M247) and nickel-based braze alloy powder having parameters of Alloy Powder 2 of Table VIII was provided. The nickel-based superalloy formed 99 wt. % of the powder composition with the remaining 1 wt % formed by the nickel-based braze alloy.

The powder composition was mixed with 5-15 vol. % of powder PTFE. The resulting mixture was mechanically worked to fibrillate the PTFE and trap the nickel-based superalloy powder and nickel-based braze alloy powder and then rolled, thus forming the nickel-based superalloy preform as a cloth-like flexible sheet of thickness 1-2 mm. This process was repeated to form the infiltration alloy preform, the difference being that the powder composition mixed with PTFE comprised 99 wt. % nickel-based braze alloy powder and 1 wt. % nickel-based superalloy powder.

The nickel-based superalloy preform was placed over a graphite base substrate. The infiltration alloy preform was arranged over the nickel-based superalloy preform to complete the layered assembly. Nickel-based superalloy powder was present in the layered assembly in an amount of 66-68 wt. %, and nickel-based braze alloy powder was present in the layered assembly in an amount of 32-34 wt. %.

Figure 3:
FIG. 3 is an SEM image of nickel-based filler alloy of Example 2 herein taken at a tilt angle of 70° for electron backscatter diffraction EBSD analysis.
Figure 4:
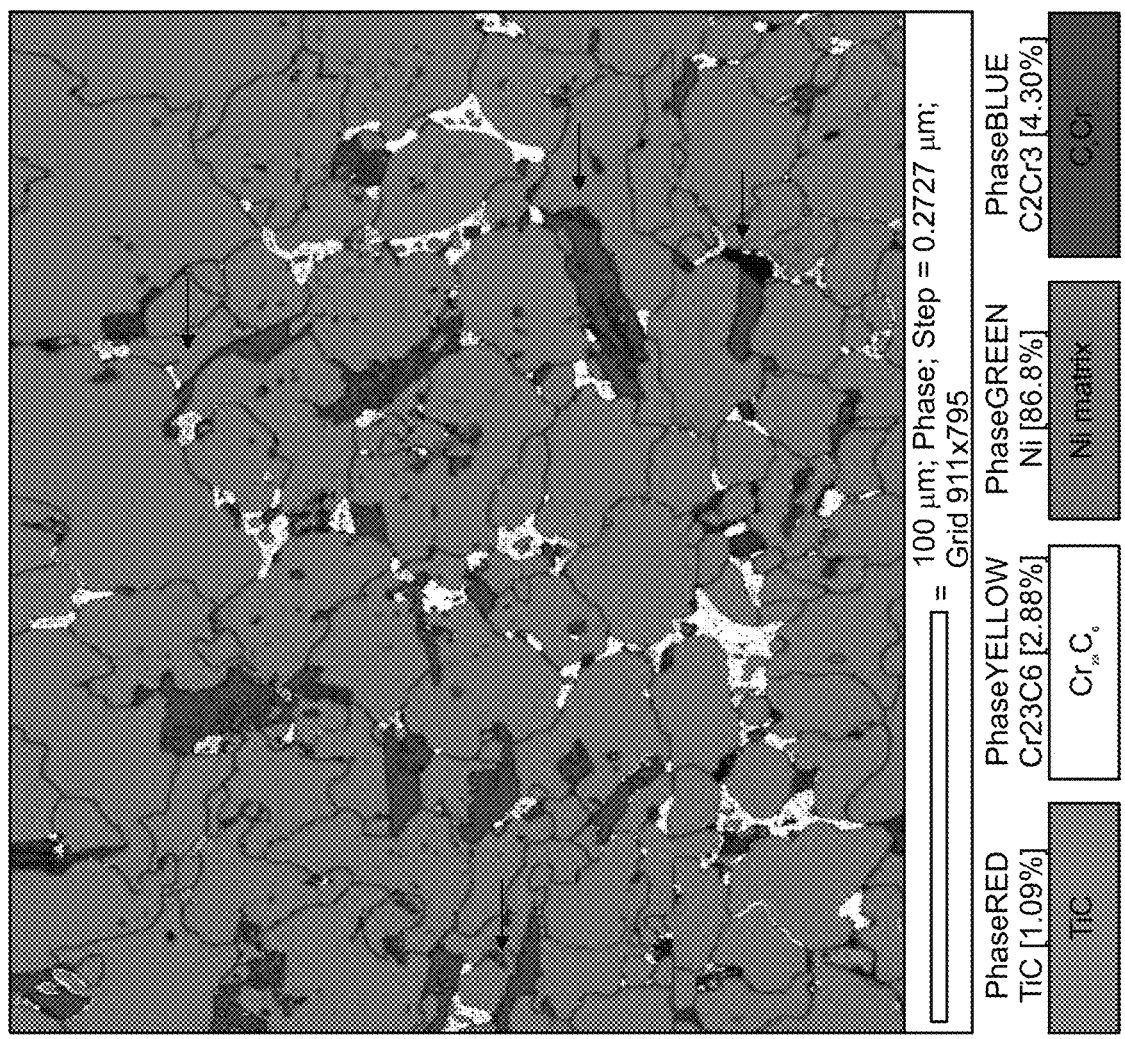
FIG. 4 is EBSD analysis quantifying microstructural phases of the nickel-based filler alloy of FIG. 3.

The layered assembly was heated in a vacuum furnace to 1190-1200° C. for a time period of 2 hours followed by heating at 1080-1090° C. for two hours. Heating was subsequently maintained at 870-880° C. for a period of 4 hours prior to cooling. The resulting nickel-based filler alloy plate was laser cut to 4×4 inches and disk ground to 0.040 in. FIG. 3 is an SEM image of the plate taken at a tilt angle of 70° for EBSD analysis. Arrows in the SEM image correspond to the arrows detailing various microstructural phases in the EBSD image of FIG. 4. As provided in FIG. 4 primary carbide of TiC and secondary carbide of $Cr_{23}C_6$ were present along grain boundaries of the nickel matrix. TiC was also found within grains of the nickel matrix. $C_2Cr_3$ phase was also present within nickel matrix grains and along matrix grain boundaries. Volume percent of the various phases are provided in Table XII.

TABLE XII

Phases of Nickel-based Filler Alloy

| Phase | Vol. % |
| --- | --- |
| TiC | 1.09 |
| $Cr_{26}C_3$ | 2.88 |
| $C_2Cr_3$ | 4.32 |
| Ni-matrix | 86.8 |

The plate of nickel-based filler alloy was tested for elevated temperature (1800° F.) tensile strength and % elongation according to ASTM E21. The results are provided in Table XIII.

TABLE XIII

Tensile and % Elongation

| UTS ($\sigma_{TS}$), ksi | Percent of Mar M247 $\sigma_{TS}$ | % Elongation |
| --- | --- | --- |
| 32 | 35.3 | 8-10 |

As provided in Table IX, $\sigma_{TS}$ of the nickel-based filler alloy was 35.3 percent of the $\sigma_{TS}$ for Mar M247.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A nickel-based superalloy article comprising:
   a damaged region; and
   a nickel-based filler alloy metallurgically bonded to the damaged region, the nickel-based filler alloy having composition of 8-15 wt. % chromium, 7-14 wt. % cobalt, 0.1-5 wt. % molybdenum, 5-11 wt % tungsten, 1-5 wt. % tantalum, 2-7 wt. % aluminum, 0.1-1.5 wt % boron, 0.1-5 wt % titanium, 0-2 wt % hafnium, 0.05-1 wt. % carbon, 0-0.5 wt. % yttrium and the balance nickel, wherein primary carbide and secondary carbide phases are present in the nickel-based filler alloy in a combined amount of 0.5 to 10 vol. %.

2. The nickel-based superalloy article of claim 1, wherein the nickel-based filler alloy is of composition 10-12 wt. % chromium, 9-11 wt. % cobalt, 0.3-0.5 wt. % molybdenum, 5-7 wt % tungsten, 2-3 wt. % tantalum, 4-5 wt. % aluminum, 0.7-1 wt % boron, 0.5-0.8 wt % titanium, 0.6-1 wt % hafnium, 0.05-0.2 wt. % carbon, 0-0.5 wt. % yttrium and the balance nickel.

3. The nickel-based superalloy article of claim 1, wherein secondary $M_{23}C_6$ carbides are present in an amount of 1 to 4 vol. % of the nickel-based filler alloy.

4. The nickel-based superalloy article of claim 1, wherein secondary $M_{23}C_6$ carbides are present in an amount of 2 to 3 vol. % of the nickel-based filler alloy.

5. The nickel-based superalloy article of claim 3, wherein M is one or more transition metals selected from the group consisting of chromium, molybdenum and tungsten.

6. The nickel-based superalloy article of claim 3, wherein primary MeC carbides are present an amount of 0.5 to 5 vol. % of the nickel-based filler alloy.

7. The nickel-based superalloy article of claim 6, wherein Me is selected form the group consisting of titanium, tantalum and hafnium.

8. The nickel-based superalloy article of claim 6, wherein the nickel-based filler alloy further comprises a $C_2Cr_3$ phase.

9. The nickel-based superalloy article of claim 1, wherein tensile strength of the nickel-based filler alloy is 50-70% of the nickel-based superalloy article tensile strength according to ASTM E21—Standard Test Methods for Elevated Temperature Tension Testing of Metallic Materials.

10. The nickel-based superalloy article of claim 9, wherein nickel-based filler alloy has at least 2 percent elongation according to ASTM E21—Standard Test Methods for Elevated Temperature Tension Testing of Metallic Materials.

11. The nickel-based superalloy article of claim 10, wherein nickel-based filler alloy has up to 10 percent elongation according to ASTM E21—Standard Test Methods for Elevated Temperature Tension Testing of Metallic Materials.

12. The nickel-based superalloy article of claim 1, wherein the damaged region comprises a hole in a surface of the nickel-based superalloy article.

* * * * *